United States Patent [19]
Kent

[11] 3,721,284
[45] March 20, 1973

[54] BUFFING MACHINE

[75] Inventor: Jan Herbert Farquhaison Kent, Saint Martin, Channel Islands, Great Britain

[73] Assignee: Kentvedder Limited, St. Saviour, Jersey, Channel Islands, Great Britain

[22] Filed: June 25, 1971

[21] Appl. No.: 156,613

[52] U.S. Cl. ................................... 157/13
[51] Int. Cl. ................................. B29h 21/08
[58] Field of Search ......................... 157/13

[56] References Cited
UNITED STATES PATENTS

| 2,294,047 | 8/1942 | Pollock | 157/13 |
| 2,696,657 | 12/1954 | Constantakis | 157/13 |
| 2,717,640 | 9/1955 | Schnoebelen | 157/13 |
| 2,897,882 | 8/1959 | Barrett | 157/13 |

*Primary Examiner*—Granville Y. Custer, Jr.
*Attorney*—Donald M. Wright et al.

[57] ABSTRACT

A buffing machine primarily for tires wherein two discs are mounted to revolve about parallel axes, each disc having teeth which cut in a common plane. The discs revolve in the same direction, the cutting action of their respective teeth being from opposite sides of the tire so as to eliminate thrust.

5 Claims, 4 Drawing Figures

BUFFING MACHINE

This invention relates to a machine for buffing tire treads.

It is the practice in the re-treading industry to prepare the tread of a worn tire by subjecting it to the action of a buffing wheel or rasp.

In British Pat. specification No. 724,054 the two objectives of rasping the tires tread surface and at the same time causing the tire to revolve are achieved by spreading the beads so as to make the tread area assume a flat surface and then applying it to a revolving disc rasp with its plane somewhat offset from the axis of the rasp. The speed of rotation of the tire is then controlled by the degree of offset without the need of any brake gear.

Considering the relative positions of the tire tread and the rotating teeth it will be clear that most of the interaction, by which the tire tread is buffed, will be in the area surrounding the center of the disc where the tooth velocity will be least. If the tire tread and disc be offset to a marked degree the drive transmitted to the tire will be so increased as to cause its rapid rotation when the relative speeds of the bulk of the teeth and the tread will nearly balance thus reducing their cutting power. To rectify this a braking mechanism would be required which is contra to the objective. The buffing speed of the machine is thus limited.

We have now discovered that it is possible to achieve an increase in buffing speed by using the fastest moving teeth on the larger radii of the disc and balancing their thrust on the tire by using two discs instead of one, each rotating in the same direction and arranging the application of the tire tread so that the contact is spread equally or nearly equally between the two rasps.

According to the present invention a method of buffing the tread of a tire which is supported to revolve about its axis comprises applying a rasping action to the tread by a pair of rasping tools mounted to revolve about substantially parallel axes and which are driven in the same direction, whereby their cutting faces traverse the tread from opposite sides to produce a rasping action in opposite directions.

A buffing machine in accordance with the invention may comprise two discs provided with cutting teeth which are mounted to revolve about parallel axes and so arranged that the discs revolve in a common plane tangential to the tread face, means being provided for imparting drive to the discs so that they rotate in the same direction and in the areas of contact of the teeth with the tire so that the cutting action of the teeth on the two discs will be opposite to one another and thereby will eliminate or reduce the side thrust on the tire.

The invention is illustrated in the accompanying drawings in which.

Figure 1:
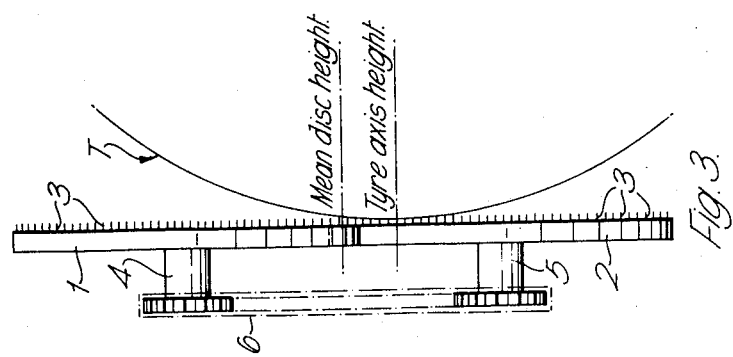
FIGS. 1 and 2 are diagrammatic views showing two buffing discs or rasps arranged to operate with alternative forms of drive.
Figure 2:
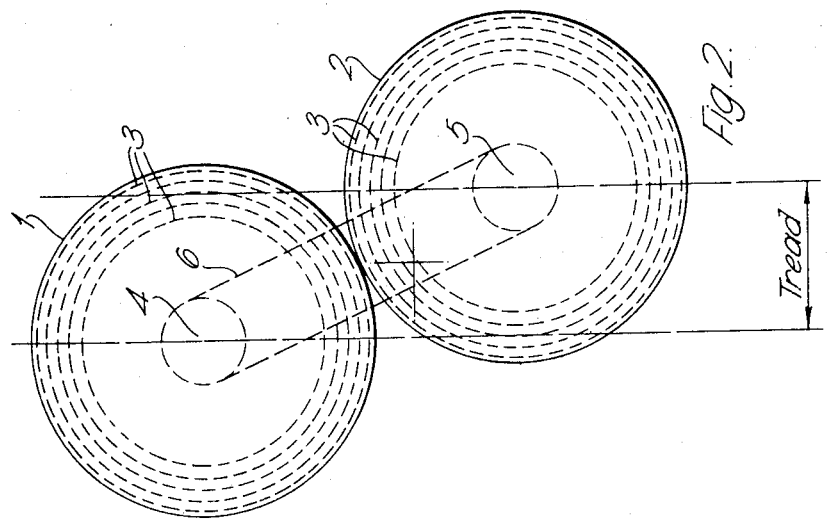
Figure 3:
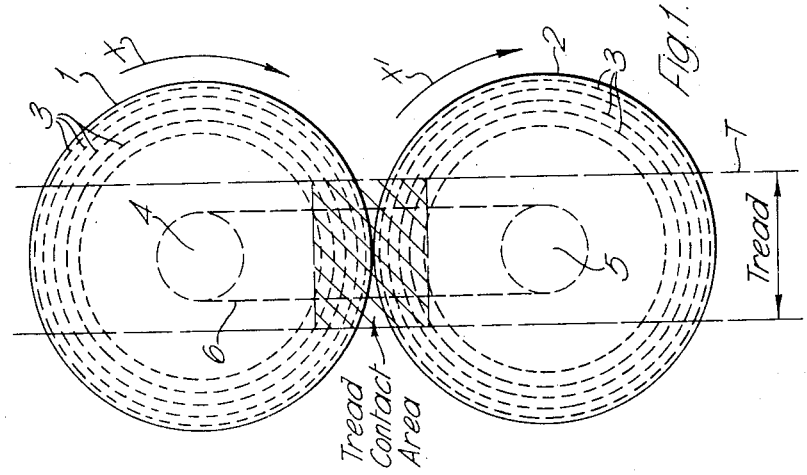
FIG. 3 is an end-on view of the arrangement of FIG. 1 but including the tire to be buffed.

Referring to FIGS. 1-3 of the drawings, 1 and 2 indicate two discs arranged one above the other, each provided on its reverse or inner face with a cutting or rasping surface 3, which, in the embodiment illustrated, consists of an annular row of pins. The two discs are mounted to revolve about parallel horizontal axes for which purpose they are fast on shafts 4, 5, coupled to one another through a belt or chain drive indicated at 6 so that the two rasps revolve in the same direction as indicated by the arrows X, X'.

The tire to be buffed is indicated at T and it will be seen that the contact area is half at 6 o'clock on the upper rasp and half at 12 o'clock on the lower rasp and as the discs are rotating in the same direction the teeth will be moving in opposite directions when considering the upper contact area in relation to the lower one.

The fact that the area of tire tread in contact with the two rasps is equally spaced eliminates any tendency for the tire to be thrust to one side or the other and eliminates the necessity, as is the practice in existing buffing machines having a single rasp, of providing for reversal of the cutting means by an oscillating movement at its half way point.

In the arrangement of FIG. 1 where the axes are in vertical alignment and the thrusts on the tire are in balance, there will be no rotation transmitted to the tire so that some form of drive for turning the tire is necessary, but there are conditions where this is unacceptable.

In the arrangement shown in FIG. 2, where the axes of the discs are not in the plane of the tire, a rotational thrust may be imparted to the tire by adjusting the relative height of the axis of the tire to the mean axis height of the discs so that the cutting means on one disc will enter fractionally further into the tire tread material thus exerting a greater upward or downward thrust than the other disc.

Furthermore, the fact that the discs rotate in the same direction simplifies the drive arrangements and makes it possible to fit the second disc assembly as an addition to the single disc machines described in the aforesaid British Pat. specification No. 724,054.

Figure 4:
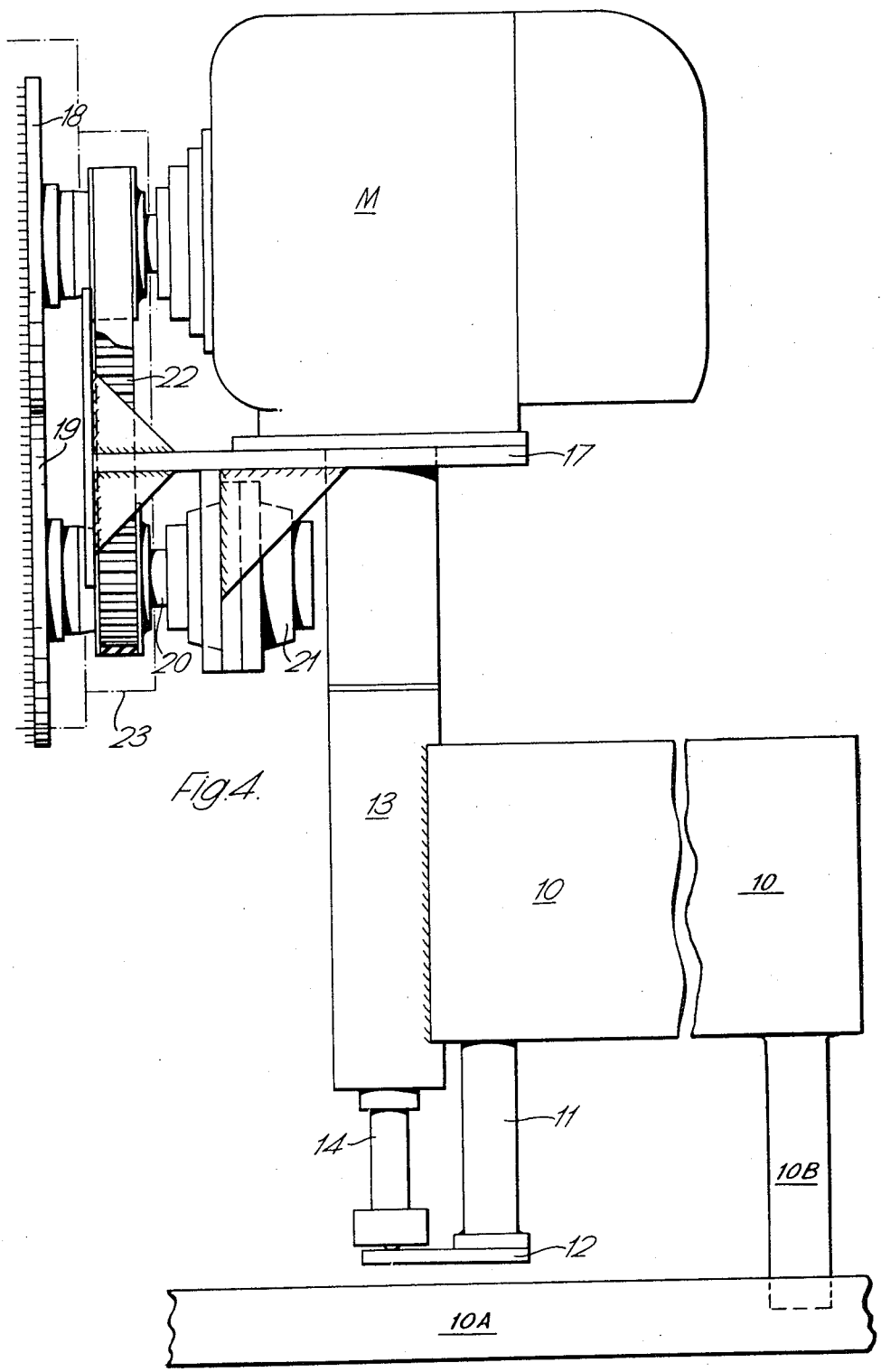
FIG. 4 is a side view of a twin head buffer spreader in accordance with the invention.

Referring now to FIG. 4, there is shown a buffing machine for use in conjunction with a spreader, the former being mounted on an articulated arm 10 supported from a main base frame 10A by a pivotal extension 10B of the arm 10 so that the arm 10 can be swung in a horizontal plane, and depending from the arm 10 is a column 11 supporting a sub-frame or base plate 12. Also attached to the arm 10 is an internally threaded sleeve 13 mounting a screwed shaft 14 for engagement at its lower end with the plate 12, by means of which a table 17 carrying the motor M at its upper end can be raised or lowered. Fast on the drive shaft for motor M is a rasp plate 18 and fast on a lay shaft 20 is a rasp plate 19, the latter being mounted to revolve in a bearing housing 21 on the underside of the table 17. Drive is transmitted from the drive shaft of the motor through a belt and pulley indicated generally at 22. 23 is a dust shield.

It will be appreciated that the buffing machine of this invention can be adapted to other purposes, e.g., buffing conveyors.

What is claimed is:

1. A tire buffing machine for buffing treads of tires comprising a pair of rasping tools each having a cutting face, means supporting the tools to revolve about parallel axes with their cutting faces in a common plane tangential to the tread of the tire to be buffed, means for imparting drive to the rasping tools so that they revolve in the same direction but such that in the area of contact with the tread of the tire their respective cutting faces move in opposition to each other.

2. A tire buffing machine for buffing treads of tires comprising two disc elements, means supporting the disc elements to revolve about parallel axes, each disc element having cutting faces on one side thereof provided by a series of annular arranged teeth arranged in a common plane for engagement with the tread of a tire, means for imparting drive to the disc elements so that they revolve in the same direction whereby the cutting faces traverse the tread of a tire to be buffed from opposite sides to produce a rasping action in opposite directions.

3. A tire buffing machine as claimed in claim 2 comprising a main frame; drive spindles mounting the disc elements; and means carried by the main frame journalling said spindles to revolve about horizontal axes.

4. A machine as claimed in claim 2 comprising a main frame having a sub-frame mounting the two discs and a drive motor therefor in which the sub-frame is adjustably supported on the main frame.

5. A machine as claimed in claim 4 including an arm mounted on the main frame for swinging in a horizontal plane, the sub-frame being mounted on said arm to swing horizontally therewith.

* * * * *